United States Patent [19]
Yui et al.

[11] Patent Number: 5,462,590
[45] Date of Patent: * Oct. 31, 1995

[54] INK-JET INK AND METHOD OF PRINTING USING THE SAME

[75] Inventors: Toshitake Yui; Yoshiro Yamashita; Fuminori Koide; Akihiko Chujo; Ken Hashimoto, all of Minami-ashigara, Japan

[73] Assignee: Fuji Xerox Co., Ltd., Tokyo, Japan

[*] Notice: The portion of the term of this patent subsequent to Jul. 11, 2012, has been disclaimed.

[21] Appl. No.: 184,195

[22] Filed: Jan. 18, 1994

[30] Foreign Application Priority Data

Jan. 25, 1993 [JP] Japan ................. 5-027124

[51] Int. Cl.$^6$ ........................ C09D 11/02
[52] U.S. Cl. ............ 106/20 R; 106/22 H; 106/23 H
[58] Field of Search ............... 106/22 H, 23 H, 106/20 R

[56] References Cited

U.S. PATENT DOCUMENTS

| | | | |
|---|---|---|---|
| 4,455,168 | 6/1984 | Shimada et al. | 106/22 H |
| 5,254,159 | 10/1993 | Gundlach et al. | 106/22 R |

FOREIGN PATENT DOCUMENTS

| | | |
|---|---|---|
| 57-209972 | 12/1982 | Japan . |
| 1-149872 | 6/1989 | Japan . |
| 148560 | 6/1989 | Japan . |
| 2-233781 | 9/1990 | Japan . |
| 2-233780 | 9/1990 | Japan . |

OTHER PUBLICATIONS

"Grant & Hackh's Chem. Dictionary", 5th Ed. Grant et al. pp. 22 & 23, 1989.

*Primary Examiner*—Helene Klemanski
*Attorney, Agent, or Firm*—Oliff & Berridge

[57] ABSTRACT

An ink-jet ink contains water, a coloring material and an amine compound represented by the formula: $R_1 R_2 R_3 N$ (I) wherein one or two of $R_1$, $R_2$ and $R_3$ represent(s) (an) alkyl group(s) having 1 to 5 carbon atoms substituted by at least one group selected from the group consisting of a carboxy group, a sulfonic acid group, and a Li, Na, Na, K or ammonium salt thereof, and the remainder represents(s) (an) hydrogen atom(s) or (an) alkyl group(s) having 1 to 5 carbon atoms substituted by a hydroxide group or a carbamoyl group. The pH value of the ink is preferably between 6 to 8. Moreover, printing may be made by applying thermal energy to the ink and forming droplets.

The ink and the method of printing using the ink may prevent the change of the amount of ink droplets due to kogation on a heater even with a long-term use, and may not cause a heater trouble due to the corrosion of materials constantly in contact with ink. Further, even if the ink is stored for a long-period, the pH of the ink may be kept to be stable and clogging of print head may be prevented and change of hue of images may be avoided.

19 Claims, No Drawings

INK-JET INK AND METHOD OF PRINTING USING THE SAME

FIELD OF THE INVENTION

The present invention relates to improved ink-jet inks used for ink-jet type printers and method of printing using the inks.

DESCRIPTION OF THE PRIOR ART

So called ink-jet type printers, which jet a liquid or fused solid ink from a nozzle, slit or porous film and the like and make printing on paper, cloth, film and the like, have many advantages such as compact, low-cost and essentially noise-free properties and are on the market in large quantities as black single color or full-color printers. Among them, so called thermal ink-jet systems have many advantages such as high-speed printing and high resolution.

On the other hand, inks used for ink-jet printers have many characteristics to be controlled, among which pH of the ink must satisfy a variety of required characteristics as follows:

(1) kogation on a heater owing to a temperature change, or a heater trouble where a material constantly in contact with the ink corrodes by the ink, and finally a work electrode on a heater part short-circuits and fails to actuate. The term "heater" as used herein means the part forming and developing bubbles by an elevated temperature in thermal ink-jet system;

(2) separation of the component of ink, especially a dye in ink in which the dye is dissolved when stored for a long-term;

(3) clogging of printhead;

(4) hue of images when printed on paper;

and the long-term stabilization is very important. Thus many suggestions have been made heretofore.

For example, Japanese Patent Application (OPI) (the term "OPI" as used herein means an unexamined published patent application) No. Sho 57- 209972 suggests that pH of ink may be controlled to 4 to 9 by using an acid or an alkali such as hydrochloric acid, sulfuric acid, sodium hydroxide and the like in ink used in thermal ink-jet system. Japanese Patent Application (OPI) No. Hei 1-149872 describes sodium borate, sodium hydrogen phosphate as preferable examples of pH buffers. Japanese patent Applications (OPI) Nos. Hei 2-233780 and 2-233781 describe that discolor may be avoided when printed on normal paper, especially paper having high acidity by combining phthalocyanine or Direct Yellow 86 and organic alkali metal salt of carboxylic acid.

As mentioned above, although the controls of the pH of ink-jet printing ink used in thermal ink-jet system have been suggested, ink satisfying the above all required characteristics could not be obtained in any of the above suggested methods.

SUMMARY OF THE INVENTION

Therefore, the purpose of the present invention is to provide ink-jet ink and method of printing using the ink which can prevent change of the amount of droplets of ink or variation of picture quality even with a long-period use, and which may not cause heater trouble in which materials constantly in contact with the ink corrodes due to the ink and finally a work electrode in a heater part short-circuits and fails to actuate, and which may keep ink pH stable even with a long-term storing and may prevent clogging of printhead and variation of hue of images when printed on paper.

The inventors have have found that ink can be obtained which may alleviate change of the amount of droplets of ink on a heater even with a long-period use, and may not change the image quality, and may not cause a heater trouble, and can control the pH of the ink over a long-period, and may prevent clogging of printhead, and may not change the hue of image when printing by adding amine compound having carboxy group or sulfonic acid group or salts thereof in alkyl side chain to a ink-jet ink containing water and coloring material as essential components and have completed the present invention.

Thus the present invention provides an ink used for an ink-jet printer which forms droplets by the effect of thermal energy to make printing, characterised by comprising at least water, a coloring material and an amine compound represented by the following formula(I):

$$R_1R_2R_3N \qquad (I)$$

wherein one or two of $R_1$, $R_2$ and $R_3$ represent(s) (an) alkyl group(s) having 1 to 5 carbon atoms substituted by at least one group selected from the group consisting of a carboxy group, a sulfonic acid group, and a Li, Na, K or ammonium salt thereof, and the remainder represents(s) (an) hydrogen atom(s) or (an) alkyl group(s) having 1 to 5 carbon atoms substituted by a hydroxide group or a carbamoyl group, provided that two of $R_1$, $R_2$ and $R_3$ may be the same substituent groups.

The pH of the ink of the present invention may be between 6 and 8.

The ink of the present invention may further comprise a water-soluble organic solvent.

The ink of the present invention may comprises 0.3 to 10% by weight of said coloring material, 10 to 40% by weight of said water-soluble organic solvent, 0.5 to 3% by weight of said amine compound and the balance water based on the whole amount of said ink.

The ink of the present invention may comprise 1 to 8% by weight of said coloring material, 10 to 30% by weight of said water-soluble organic solvent, 0.5 to 2% by weight of said amine compound and the balance water based on the whole amount of said ink.

The ink of the present invention may further comprise 0.005 to 3% by weight of a surface active agent based on the whole amount of said ink.

pKa value of said amine compound may be between 6.50 and 7.50.

In the above general formula (I), one or two of $R_1$, $R_2$ and $R_3$ represent(s) (an) alkyl group(s) having 1 to 5 carbon atoms substituted by a carboxy group or a sulfonic acid and the remainder represent(s) (a) hydrogen atom(s) or (an) alkyl group(s) having 1 to 5 carbon atoms substituted by a hydroxide group or a carbamoyl group, provided that two of $R_1$, $R_2$ and $R_3$ may be the same substituent groups.

The ink of the present invention may further comprise one or more basic compound(s) selected from a basic salt having an alkaline metal and basic quaternary ammonium.

In the ink of the present invention, 0.5 to 2 mole % of said basic compound may be contained to 1 mole % of said amine compound.

The amine compound may be represented by the following formula (II) or (III):

$$(HO-(CH_2)_2-N-(CH_2)m-SO_3H \qquad (II)$$

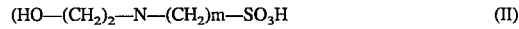

$$H_2NCO(CH_2)n-N-(CH_2COOH)_2 \qquad (III)$$

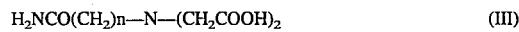

wherein m and n each represents an integer between 1 to 5.

The present invention also provides a method of printing using the above ink-jet ink characterized by applying thermal energy to the ink-jet ink, forming droplets and making printing.

DESCRIPTION OF THE PREFERRED EMBODIMENT

The present invention will be detailed hereinafter.

The ink-jet ink of the present invention contains water and a coloring material as essential components and comprises the amine compound represented by the above general formula (I) and, if necessary, a water-soluble organic solvent and another optional component, and can be applied to thermal ink-jet system.

The coloring material used in the present invention may be any of a variety of water-soluble dyes, pigments, disperse dyes containing colored polymer/wax, oil-soluble dyes and the like. Among them, the water-soluble dyes which are most excellent in the jettability are appropriate. The water-soluble dyes may be any of acid dyes, direct dyes, basic dyes, disperse dyes and the like, and more preferably be direct dyes and acid dyes.

Such dyes may include, for example, C. I. Direct Black-4,-9,-11 ,-17 ,-19,-22,-32,-80 ,-151 ,-154, - 168,-171,-194, C.I.Direct Blue-1,-2 ,-6,-8,-22 ,-34,-70,- 71,-76,-78,-86,-142,-199,-200,-201,-202,-203,-207,-218,- 236,-287, C.I.Direct Red-1,-2,-4,-8,-9,-11,-13,-15,-20,- 28,-31,-33,-37,-39,-51,-59,-62,-63,-73,-75,-80,-81,-83,-    87,-90,-94,-95,-99,-101,-110,-189,C. I. Direct Yellow-1,- 2,-4,-8,-11,-12,-26,-27,-28,-33,-34,-41,-44,-48,-86,-87,      -88,-135,-142,-144, C.I.Food Black-1,-2, C.I.Acid Black-1,-2,-7,-16,-24,-26,-28,-31,-48,-52,-63,-107,-112, -2,-118,-119,-121,-172,-194,-208, C. I. Acid Blue-1,-7,- 9.-15,-22,-23,-27,-29,-40,-43,-55, -59,-62,-78,-80,-81,- 90,-102,-104,-111,-185,-254, C.I.Acid Red-1,-4,-8,-13,- 14,-15,-18,-21,-26,-35,-37,-249,-257, C. I.Acid Yellow- 1 ,-3 ,-4,-7,-11 ,-12 ,-13,-14,-19 ,-23,-25,-34 ,-38 ,-41 ,-42, -44,-53,-55,-61,-71,-76,-79 and the like.

Although such dyes may be used alone, or may be used by mixing two or more than two dyes together, or may be toned to custom colors such as red, blue, green and the like as well as elementary colors of cyan, magenta,yellow and black.

Further, as pigments, for example, carbon black, brilliant carmine BS, lake carmine FB, brilliant fast scarlet, diazo yellow, permanent red R, fast yellow 10G , phthalocyanine blue, blue lake, yellow lake, rhodamine lake and the like may be used.

The content of these coloring material is appropriately ranging from 0.3 to 10% by weight, and preferably ranging from 1 to 8% by weight based on the whole amount of the ink.

The ink of the present invention may contain a water-soluble organic solvent together with water and the coloring materials. As the water-soluble organic solvent, for example, pyrrolidone, N-methyl-2-pyrrolidone, triethanolamine, dimethyl sulfoxide, sulfolane and the like and alcohols such as ethanol, isopropanol, butanol, benzyl alcohol and the like; as well as polyols such as ethylene glycol, diethylene glycol, triethylene glycol, polyethylene glycol, propylene glycol, glycerin, thiodiglycol and the like; and glycol ethers such as ethylene glycol, monomethyl ether, ethylene glycol monobutyl ether, diethylene glycol monoethyl ether, propylene glycol monomethyl ether and the like may be used.

The amine compound used as a pH adjustor of the ink of the present invention has at least one carboxy group or sulfonic acid group or a salt thereof in the molecule as represented by the general formula (I):

$$R_1R_2R_3N \qquad (I)$$

wherein $R_1$, $R_2$ and $R_3$ has the same meaning as mentioned above.

In the formula, the alkyl group substituted by a carboxy group may include, for example, carboxymethyl group, 1-carboxyethyl group, 2-carboxyethyl group, 1-carboxy-n-propyl group, 2-carboxy-n-propyl group, 3-carboxypropyl group, 2-carboxy-i-propyl group, 1-carboxy-n-butyl group, 4-carboxybutyl group, 3-carboxy-i-butyl group, 2-methyl-4-carboxybutyl group, carboxy-t-butyl group, 5-carboxypentyl group and the like. The alkyl group substituted by a sulfonic acid group may include, for example, the above alkyl groups substituted by carboxy groups in which the carboxy groups are replaced with sulfonic acid groups. These acidic groups may be substituted for alkyl groups in the forms of lithium, sodium, potassium or ammonium salts.

The alkyl group substituted by a hydroxide group may include, for example, methylol group, 2-hydroxyethyl group, methylolmethyl group, 1-hydroxy-n-propyl group, 2-hydroxy-n-propyl group, 3-hydroxy-propyl group, 2-hydroxy-i-propyl group, 1-hydroxy-n-butyl group, 2-hydroxy-n-butyl group, 4-hydroxybutyl group, 3-hydroxy-i-butyl group, 2-methyl-3-hydroxybutyl group, hydroxy-t-butyl group, 4-hydroxy-n-pentyl group, 5-hydroxypentyl group and the like. The alkyl group substituted by a carbamoyl group may include, for example , the above alkyl groups substituted by carboxy groups in which the carboxy groups are substituted by carbamoyl groups.

The amine compound may inlude, as representative examples, glycine, N-hydroxyethyl glycine, N-carbamoyl-methyl-β-alanine, N-hydroxyethyl-N-carbamoylmethyl glycine, N-hydroxymethyl-N-carbamoyl-methyl-γ-aminobutyric acid, N-carboxymethyl iminodiacetoamido, N-carbamoylmethyl iminodiacetic acid, N-hydroxypropl iminodipropionic acid, β-aminoethane sulfonic acid (taurin), N-hydroxyethyl aminoethane sulfonic acid, N-hydroxypropylethane sulfonic acid, N-carbamoylmethyl aminoethane sulfonic acid, N,N,-bis-hydroxyethylaminoethane sulfonic acid, N-hydroxyethyl-N-carbamoyl methyl aminomethane sulfonic acid, N-hydroxyethyl-N-carbamoyl methylaminoethane sulfonic acid, N,N,-bis-carbamoyl methylaminoethane sulfonic acid, N-hydroxyethyl iminodiethane sulfonic acid and the like, or the above salts thereof.

If the number of carbon atoms of the alkyl group bonded to a nitrogen atom of the amine compound represented by the above general formula is equal or more than six, the viscosity of the ink increases remarkably even with the addition of a few amount and the solubility in the ink is insufficient and thus it is not preferable. These amine compound may be used alone or may be used by mixing two or more than two amine compounds.

Alternatively, the amine compound may be combined with a basic salt of alkali metal selected from three alkali metals, lithium, sodium and potassium such as lithium hydroxide, sodium hydroxide and potassium hydroxide or with a nitrogen containing compound such as basic quaternary ammonium such as ammonia, pyridine, tetramethylammonium and the like.

Materials which are constantly in contact with ink in an ink-jet type printers as well as head materials do not generally tend to progress deterioration such as corrosion, dissolution and peels and the like in the vicinity of neutrality. Thus the ink of the present invention may be controlled to a given pH by selecting the kind of the above amine compound or moderating the amount of the amine compound added. However, it is effective to adjust the pH value of the ink to between 5 and 9, preferably between 6 and 8.

Further, since the amine compound is in a solid form, it may seperate out on evaporation of water or water-soluble inorganic compound at the tip of head when it is added to the ink in a large amount. Preferably, the amount of the amine compound added based on the whole amount of the ink is, however, usually equal or more than double times, for example, double to five times as much as the amount by which the pH of the ink is reached to the determined value in order to take effect remarkably. Concretely, the range from 0.5 to 3% by weight, preferably the range from 0.5% to 2% by weight is appropriate. Thus, since the amine compound of the present invention has buffer action, the pH value of the ink does not change so largely even if the amine compound is added equal or double amount.

To the ink of the present invention, so called surface active agent, dispersant, inclusion compound and the like may be added so as to further stabilize the dissolving and dispersing condition of the dyes and pigments. The surface active agent may be any of nonionic, anionic, cationic and amphoteric surface active agents.

The nonionic surface active agent may include, for example, polyoxyethylene nonyl phenyl ether, polyoxyethylene octyl phenyl ether, polyoxyethylene dodecyl phenyl ether, polyoxy ethylene alkyl ether, polyoxyethylene fatty acid ester, sorbitan fatty acid ester, polyoxyethylene/polyoxypropylene block copolymer, polyoxyethylene sorbitan fatty acid ester, fatty acid alkylol amide and the like. The anionic surface active agent may include alkyl benzene sulfonate, alkyl naphthalene sulfonate, formalin condensate of alkyl naphthalene sulfonate, higher fatty acid salt, sulfate of higher fatty acid ester, sulfonate of higher fatty acid ester, sulfate and sulfonate of higher alcohol ether, alkyl carboxylate, sulfosuccinate and ester salt of higher alkyl sulfonamide and the like. The cationic surface active agent may include primary, secondary, tertiary amine salt, quaternary ammonium salt and the like. The amphoteric surface active agent may include betaine, sulfobetaine, sulfate betaine and the like. Among them, the anionic surface active agent may be used preferably.

In addition, acrylic acid, methacrylic acid, maleic acid and salts thereof series water-soluble polymer, polyethylene imine, polyamines, polyvinyl pyrrolidone, polyethylene glycol, cellulose derivative, cyclodextrin, macrocyclic amine, crown ethers, urea, acetamide and the like may be added to the ink of the present invention. Further, an fungicide, viscosity adjustor, conducting agent and the like may be contained if necessary in the ink of the present invention.

The ink of the present invention does not cause a heater trouble even with a long-period uses in a thermal ink-jet system by containing the amine compound represented by the general formula(I) in the ink.

The kogation on a heater may be alleviated markedly when a direct dye such as disazo series and trisazo series or acid. dyes, for example, C.I.Direct Black-154, -168 and C.I.Food Black-2 and the like are used. Its mechanisms are not necessarily evident, but it can be supposed that the existance of the amine compound in an amount equal or more than predetermined amount may adjust pH value of the ink, and may relieve the occurrence of cohesion largely though these dyes molecules may easily cohere with each other and the dyes may easily kogate on a heater.

Further, the pH of the ink of the present invention can be controlled stably over a long-period, and the ink does not cause clogging or unevenness of discharge, and distinct images can be kept for a long-period after printing on paper. Moreover, though its mechanisms are not evident, bubbling of the ink in an ink-jet printer can be effectively controlled by the addition of the amine compound.

The cause of heater trouble is not necessarily evident but it can be supposed that a basic component or an acidic component in a ink erodes ingredients, especially organic macromolecular materials of printheat, further an electrode part or a wiring part of a heater may deteriorate due to migration of inorganic ions in the ink. Unlike inorganic acids used in usual pH buffer or adjustor, it is considered that the amine compound of the present invention may control the migration of inorganic ions (e.g. $Na^+$ and the like) in a ink since the amine compound has large molecular size so that a heater trouble is not caused.

The ink-jet ink of the present invention contains water and a coloring material as essential components and contains an amine compond having at least one alkyl group substituted by a carboxy group, a sulfonic acid group or a salt thereof so that the following function and effect could be obtained when printing is carried out using the ink of the present invention in a thermal ink-jet system.

Thus a heater trouble may not be caused even with a long-period use. Moreover, pH of the ink can be controlled stably, clogging of printhead can be prevented and change of hue of image may not be occurred for a long-period when printed on paper.

Especially when a direct dye such as disazo series and trisazo series or an acid dyes were used as a coloring material, kogation on a heater can be avoided markedly, the amount of ink droplets is stable and clear image can be obtained constaly.

The present invention will be detailed by the following Examples and Comparative Examples.

EXAMPLE 1

| | |
|---|---|
| C.I. Direct Black 168 | 3 parts by weight |
| Diethylene glycol | 15 parts by weight |
| Ion exchange water | 80 parts by weight |
| $(HOC_2H_4)_2NC_2H_4SO_3H$ (N,N,-Bis(2-hydroxyethyl)-2-Aminoethanesulfonic acid) Mw = 213.25 pKa = 7.15 | 0.8 parts by weight |
| Sodium hydroxide | 0.2 parts by weight |

After mixing and dissolving the above all components completely, the mixture was filtered through a 0.45 μm filter under pressure to prepare ink. The viscosity of the ink prepared was 1.8 cP and the surface tension of the ink was 55 dyn/cm.

COMPARATIVE EXAMPLE 1

| | |
|---|---|
| C.I. Direct Black 168 | 3 parts by weight |
| Diethylene glycol | 15 parts by weight |
| Ion exchange water | 80 parts by weight |
| Potassium dihydrogen phosphate | 0.1 parts by weight |
| Disodium hydrogen phosphate | 0.1 parts by weight |

COMPARATIVE EXAMPLE 2

| | |
|---|---|
| C.I. Direct Black 168 | 3 parts by weight |
| Diethylene glycol | 15 parts by weight |
| Ion exchange water | 80 parts by weight |
| Hydrochloric acid | 0.03 parts by weight |
| Sodium hydroxide | 0.02 parts by weight |

COMPARATIVE EXAMPLE 3

| | |
|---|---|
| C.I. Direct Black 168 | 3 parts by weight |
| Diethylene glycol | 15 parts by weight |
| Ion exchange water | 80 parts by weight |
| Sodium hydroxide | 0.2 parts by weight |

The above all components were dissolved and filtered to prepare ink as described in Example 1. The viscosity and the surface tension of the all inks prepared in Comparative Examples 1 to 3 were 1.8 cP and 55 dyn/cm, respectively.

EXAMPLE 2

| | |
|---|---|
| C.I. Direct Yellow 86 | 2 parts by weight |
| Glycerin | 10 parts by weight |
| Diethylene glycol monobutylether | 10 parts by weight |
| Ion exchange water | 80 parts by weight |
| $(H_2NCOCH_2)(HOC_2H_4)N(CH_2COOH)$ (N-(2-Acetamido)iminodiacetic acid) Mw = 190.16 pKa = 6.60 | 0.8 parts by weight |
| Sodium hydroxide | 0.32 parts by weight |

The above all components were dissolved and filtered to prepare ink as described in Example 1. The viscosity of the ink prepared was 2.3 cP and the surface tension of the ink was 36 dyn/cm.

COMPARATIVE EXAMPLE 4

| | |
|---|---|
| C.I. Direct Yellow 86 | 2 parts by weight |
| Glycerin | 10 parts by weight |
| Diethylene glycol monobutylether | 10 parts by weight |
| Ion exchange water | 80 parts by weight |
| Acetic acid | 0.1 parts by weight |
| Potassium hydroxide | 0.02 parts by weight |

The above all components were dissolved and filtered to prepare ink as described in Example 1. The viscosity of the ink prepared was 2.3 cP and the surface tension of the ink was 36 dyn/cm.

EVALUATION OF INK

Each ink thus prepared was evaluated on the following test items. The determined values of the surface tension (4) and of the viscosity (5) were as described before.

(1) Initial pH

The pH value of each ink was determined under an environment of 20° C. and 50% RH with a pH meter (manufactured by Horiba Seisakusho Co., Ltd.).

(2) pH After storing at a room temperature

100ml of each ink prepared was put into a 1L polymer bottle and the bottle was stopped tightly. After storing at 20° C. for one month, the pH value of each ink was determined.

(3) pH After storing at an elevated temperature (acceleration mode)

100ml of each ink prepared was put into a 1L polymer bottle and the bottle was stopped tightly and stored in a thermostatic chamber at 70° C. for 500 hours. It was then returned to an environment of 20° C. and 50% RH and and the pH value of each ink was determined.

(4) Surface tension

The Surface tension of each ink was determined under an environment of 20° C. and 50% RH with a Willhelmie type surface tension meter.

(5) Viscosity

The Viscosity of each ink was determined under an environment of 20° C. and 50% RH at a shear rate of $1400s^{-1}$.

(6) Continuous discharging test (A heater trouble)

A continuous jetting test was carried out with a thermal ink-jet printer produced by way of trial for evaluation using the head for thermal ink-jet described in Japanese Patent Application (OPI) No. Hei 1-148560 to determin the amount of ink jetted at $1 \times 10^7$ pulses and $1 \times 10^8$ pulses. The amounts were compared with the initial amounts of ink jetted using the following standards to make evaluation of heater trouble.

Good - Change of discharging amount is less than±10%,

No dislocation or turbulence of images

Moderate - Change of discharging amount is ranging from±10% to less than 20%,

Faults such as dislocation and turbulence of images and the like were less than 5%

Poor - Change of discharging amount is equal or more than±20%,

Faults such as dislocation and turbulence of images and the like were equal or more than 5%

The kogation on a heater was effectively prevented or not depending on the compositon of the ink used. The systems added by polyoxyethylene-polyoxy-propylene block copolymer series surface active agents (e.g. Example 5) could not effectively prevent the kogation due to the addition of the an amine compounds. On the other hand, the systems which were not added by surface active agents could effectively prevent the kogation on head due to the addition of an amine compound when direct dyes of disazo series and trisazo series and acid dyes were used as coloring materials.

At the same time, existence of an occurrence of a heater trouble ($\sim 1 \times 10^8$ pulses) was observed to make evaluation.

The results will be shown in the following Table I.

TABLE I

| | | | | (6) | | |
|---|---|---|---|---|---|---|
| Items | (1) | (2) | (3) | ($1 \times 10^7$ pulses) | ($1 \times 10^8$ pulses) | heater trouble |
| Ex. 1 | 7.0 | 7.0 | 7.1 | Good | Good | Good |
| Comp. Ex. 1 | 7.0 | 7.0 | 7.0 | Good | Good | Poor |
| Comp. Ex. 2 | 6.5 | 6.0 | 5.5 | Moderate | Poor | Poor |
| Comp. Ex. 3 | 8.4 | 8.0 | 7.4 | Moderate | Poor | Poor |
| Ex. 2 | 7.1 | 7.1 | 7.0 | Good | Good | Good |
| Comp. Ex. 4 | 7.7 | 6.8 | 5.4 | Moderate | Poor | Good |

The numberals in the parentheses correspond to the above numbers of the test items.

EXAMPLE 3

| | |
|---|---|
| C.I. Acid Blue 9 | 2 parts by weight |
| Ethylene glycol | 20 parts by weight |
| $(H_2NCOCH_2)NH(C_2H_4COOH)$ | 0.2 parts by weight |
| Ion exchange water | 80 parts by weight |

The above all components were dissolved and filtered to prepare ink as described in Example 1. The viscosity of the ink prepared was 2.2 cP, the surface tension was 51 dyn/cm, the initial pH was 6.9 and the pH after storing at an elevated temperature was 6.8. The heater trouble was not occurred to $1\times10^8$ pulses.

EXAMPLE 4

| | |
|---|---|
| C.I. Food Black 2 | 4 parts by weight |
| Diethylene glycol | 15 parts by weight |
| $(HOC_3H_6)N(C_2H_4COOH)_2$ | 0.6 parts by weight |
| Sodium hydroxide | 0.6 parts by weight |
| Ion exchange water | 80 parts by weight |

The above all components were dissolved and filtered to prepare ink as described in Example 1. The viscosity of the ink prepared was 1.9 cP, the surface tension was 50 dyn/cm, the initial pH was 8.0 and the pH after storing at an elevated temperature was 7.9. The heater trouble was not occurred to $1\times10^8$ pulses.

EXAMPLE 5

| | |
|---|---|
| C.I. Direct Black 154 | 3 parts by weight |
| Glycerin | 15 parts by weight |
| Diethylene glycol monobutylether | 10 parts by weight |
| $HO(C_2H_4O)_a(C_3H_6O)_b(C_2H_4O)_cH$ (oxypropylene block Mw = 1800, oxyethylene content = 20%) | 0.5 parts by weight |
| $(HOC_2H_4)NH(CH_2COOH)$ | 0.8 parts by weight |
| Sodium hydroxide | 0.2 parts by weight |
| Ion exchange water | 80 parts by weight |

The above all components were dissolved and filtered to prepare ink as described in Example 1. The viscosity of the ink prepared was 2.8 cP, the surface tension was 36 dyn/cm, the initial pH was 6.5 and the pH after storing at an elevated temperature was 6.4. The heater trouble was not occurred to $1\times10^8$ pulses.

EXAMPLE 6

| | |
|---|---|
| C.I. Direct Blue 86 | 2 parts by weight |
| Diethylene glycol | 25 parts by weight |
| $(H_2NCOCH_2)_2N(CH_2COOH)$ | 0.2 parts by weight |
| Ion exchange water | 75 parts by weight |

The above all components were dissolved and filtered to prepare ink as described in Example 1. The viscosity of the ink prepared was 2.5 cP, the surface tension was 53 dyn/cm, the initial pH was 6.7 and the pH after storing at an elevated temperature was 6.6. The heater trouble was not occurred to $1\times10^8$ pulses.

EXAMPLE 7

| | |
|---|---|
| C.I. Direct Yellow 144 | 3 parts by weight |
| Polyethylene glycol (Mw = 200) | 10 parts by weight |
| $(H_2NCOCH_2)(HOCH_2)N(C_3H_6COOH)$ | 0.6 parts by weight |
| Sodium hydroxide | 0.3 parts by weight |
| Ion exchange water | 80 parts by weight |

The above all components were dissolved and filtered to prepare ink as described in Example 1. The viscosity of the ink prepared was 1.8 cP, the surface tension was 55 dyn/cm, the initial pH was 7.2 and the pH after storing at an elevated temperature was 7.1. The heater trouble was not occurred to $1\times10^8$ pulses.

While particular forms of the invention have been described, it will be apparent that various modification can be made without departing from the spirit and scope of the invention. Accordingly, it is not intended that the invention be limited except as by the appended claims.

We claim:

1. An ink used for an ink-jet printer which forms droplets by the effect of thermal energy to make printing, wherein said ink comprises at least water, a coloring material and an amine compound represented by the following formula(I):

$$R_1R_2R_3N \qquad (I)$$

wherein one or two of $R_1$, $R_2$ and $R_3$ represent(s) (an) alkyl group(s) having 1 to 5 carbon atoms substituted by at least one group selected from the group consisting of a carboxy group, a sulfonic acid group, and a Li, Na, K or ammonium salt thereof, and the remainder represent(s) (an) hydrogen atom(s), or (an) alkyl group(s) having 1 to 5 carbon atoms substituted by a hydroxide group or a carbamoyl group, provided that two of $R_1$, $R_2$ and $R_3$ may be the same substituent groups, wherein pH of said ink is between 6 and 8.

2. The ink of claim 1 wherein said ink further comprises a water-soluble organic solvent.

3. The ink of claim 2 wherein said ink comprises 0.3 to 10% by weight of said coloring material, 10 to 40% by weight of said water-soluble organic solvent, 0.5 to 3% by weight of said amine compound and water.

4. The ink of claim 3 wherein said ink comprises 1 to 8% by weight of said coloring material, 10 to 30% by weight of said water-soluble organic solvent, 0.5 to 2% by weight of said amine compound and the balance water based on the whole amount of said ink.

5. The ink of claim 3 wherein said ink further comprises 0.005 to 3% by weight of a surface active agent based on the whole amount of said ink.

6. The ink of claim 1 wherein pKa value of said amine compound is between 6.50 and 7.50.

7. The ink of claim 1 wherein one or two of $R_1$, $R_2$ and $R_3$ represent(s) (an) alkyl group(s) having 1 to 5 carbon atoms substituted by a carboxy group or a sulfonic acid and the remainder represent(s) (a) hydrogen atom(s) or (an) alkyl group(s) having 1 to 5 carbon atoms substituted by a hydroxide group or a carbamoyl group provided that two of $R_1$, $R_2$ and $R_3$ may be the same substituent groups.

8. The ink of claim 7 wherein said ink further comprises one or more basic compound(s) selected from a basic salt having an alkali metal and basic quaternary ammonium.

9. The ink of claim 8 comprising 0.5 to 2 mole % of said basic compound was contained to 1 mole % of said amine compound in said ink.

10. The ink of claim 1 wherein said amine compound is represented by the following formula (II) or (III):

$$(HO-(CH_2)n)_2-N-(CH_2)m-SO_3H \quad (II)$$

$$H_2NCO(CH_2)n-N-(CH_2COOH)_2 \quad (III)$$

wherein m and n each represents an integer between 1 to 5.

11. A method of printing using an ink-jet ink, comprising applying thermal energy to an ink-jet ink comprising at least water, a coloring material and the amine compound represented by the general formula described in claim 1, forming droplets and printing with said droplets.

12. An ink used for an ink-jet printer, which forms droplets by the effect of thermal energy for printing, comprising 0.3–10% by weight of a coloring material, 0.5–3% by weight of an amine compound represented by the following formula (II) or formula (III):

$$(HO-(CH_2)_n)_2-N-(CH_2)_m-SO_3H \quad (II)$$

$$H_2NCO(CH_2)_n-N-(CH_2COOH)_2 \quad (III)$$

wherein m and n each represents an integer between 1 to 5 or a Li, Na, K or ammonium salt thereof, 10 to 40% by weight of a water-soluble organic solvent and water.

13. The ink of claim 12, wherein pH of said ink is between 6 and 8.

14. The ink of claim 12, wherein said ink comprises 1 to 8% by weight of said coloring material, 10 to 30% by weight of said water-soluble organic solvent, 0.5 to 2% by weight of said amine compound and the balance water based on the whole amount of said ink.

15. The ink of claim 12 wherein said ink further comprises 0.005 to 3% by weight of a surface active agent based on the whole amount of said ink.

16. The ink of claim 12 wherein the pKa value of said amine compound is between 6.50 and 7.50.

17. The ink of claim 12 wherein said ink further comprises one or more basic compound(s) selected from a basic salt having an alkali metal and basic quaternary ammonium.

18. The ink of claim 17, wherein 0.5 to 2 mole % of said basic compound to 1 mole % of said amine compound is contained in said ink.

19. A method of printing using an ink-jet ink, comprising applying thermal energy to an ink-jet ink comprising at least water, a coloring material and an amine compound represented by formula (II) or formula (III) of claim 12, forming droplets and printing with said droplets.

* * * * *